United States Patent Office 3,706,751
Patented Dec. 19, 1972

3,706,751
CERTAIN POLYHALO-4-NITRO-PICOLINONITRILES
Penelope B. Domenico, Danville, Calif., assignor to The Dow Chemical Company, Midland, Mich.
No Drawing. Original application July 3, 1969, Ser. No. 839,066, now Patent No. 3,629,281, dated Dec. 21, 1971. Divided and this application Mar. 18, 1971, Ser. No. 125,874
Int. Cl. C07d 31/46
U.S. Cl. 260—294.9
2 Claims

ABSTRACT OF THE DISCLOSURE

Disclosed as novel compounds are polyhalo-4-nitropyridine derivatives which are substituted in the 6-position by cyano, trifluoromethyl or methylsulfonyl groups. The compounds have utility as pesticides and are variously effective as herbicides and as active constituents fungicidal and bacteriocidal compositions.

CROSS REFERENCE TO RELATED APPLICATION

This application is a division of our co-pending application Ser. No. 839,066, filed July 3, 1969, now U.S. Pat. No. 3,629,281 dated Dec. 21, 1971.

Co-pending application, Ser. No. 772,429, filed Oct. 31, 1968, now U.S. Pat. 3,607,877 dated Sept. 21, 1971 discloses a novel method of preparing the compounds of the present invention.

SUMMARY OF THE INVENTION

The novel compounds of the present invention are substituted polyhalo-4-nitropyridines of the formula

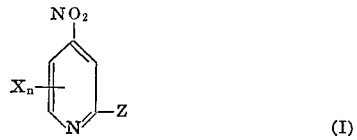

(I)

wherein X represents chloro or bromo, $n$ is an integer having a value of 2 or 3 and Z represents a cyano, methylsulfonyl or a trifluoromethyl group. For convenience of description, the compounds coming within the scope of the above formula, as defined herein, are referred to in the specification and claims as "substituted polyhalo-4-nitropyridine" compounds or more simply as "substituted" compounds or pyridine compounds.

The novel compounds of this invention are off-white to yellow crystalline or waxy solids having very slight to moderate solubility in water and good solubility in benzene, acetone, dichloromethane, carbon tetrachloride, ethanol and isopropanol. Said novel compounds have utility in a wide variety of pesticidal applications. Thus, they are useful in the control of weeds and of fungi which are deleterious to growing plants. They are useful as the active component of fungicidal and bacetriocidal compositions.

Representative novel compounds coming within the scope of the present invention include the following:

3,5,6-trichloro-4-nitropicolinonitrile
2,3,5-trichloro-4-nitro-6-(trifluoromethyl)pyridine
2,3,5-trichloro-6-(methylsulfonyl)-4-nitropyridine
3,5-dichloro-6-(methylsulfonyl)-4-nitropyridine
2,3,5-tribromo-6-(methylsulfonyl)-4-nitropyridine
2,3,5-tribromo-4-nitro-6-(trifluoromethyl)pyridine
2,3,5-tribromo-4-nitropicolinonitrile
3,6-dichloro-4-nitropicolinonitrile
3,5-dichloro-4-nitro-6-(trifluoromethyl)pyridine
3,5-dibromo-6-(methylsulfonyl)-4-nitropyridine
3,6-dibromo-4-nitropicolinonitrile
3,5-dichloro-4-nitropicolinonitrile
3,5-dibromo-4-nitropicolinonitrile
3,5-dibromo-4-nitro-6-(trifluoromethyl)pyridine
2,5-dichloro-4-nitro-6-(trifluoromethyl)pyridine The substituted polyhalo-4-nitropyridine compounds of the present invention can be prepared by intimately contacting and causing to react concentrated nitric acid with the corresponding substituted, polyhalopyridine compound having a thiol group attached to the 4-position of the pyridine ring, as represented by the formula

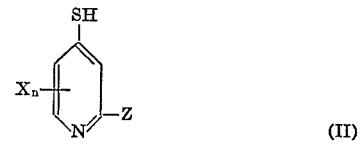

(II)

wherein $X_n$ and Z are as defined above. This reaction takes place readily as the substituted halopyridine reactant is added to an excess of nitric acid having a concentration of from about 90–100 percent, with stirring. The reaction is frequently initiated at relatively low temperatures such as about 0° C., or even lower, with temperatures then being gradually raised to a level of about 80°–120° C. over the course of a one-half to a two or more hour reaction period. The progress of the reaction can be followed by the use of infrared or other analytical methods whereby product aliquots can be monitored for the presence of nitro and nitroso groups. The reaction is complete when the nitroso groups essentially disappear.

The present substituted polyhalo-4-nitropyridine compounds can be isolated from the reaction mixture by conventional procedures such as by precipitation in water, washing, extraction, sublimation, solvent extraction and recrystallization. These compounds can be further purified, if desired, by chromatographic, distillation, or other liquid-liquid or vapor-liquid separating and recovery techniques.

The compounds of the present invention can be prepared by adaptation of procedures known to the skilled in the art. Thus, it is to be understood that modifications of other methods known in the art for the preparation of compounds having similar halo, nitro, cyano, methylsulfonyl or trifluoromethyl groupings may be substituted for the above procedures.

DESCRIPTION OF THE PREFERRED EMBODIMENT

The following examples illustrate the invention but are not to be construed as limiting.

EXAMPLE 1

2,3,5-trichloro-6-(methylsulfonyl)-4-nitropyridine

In this operation, 2,3,5-trichloro-6-(methylsulfonyl)-4-pyridinethiol (5 g., 0.017 mole) is slowly added over a ten minute period to 20 ml. of stirred nitric acid having an NHO₃ concentration of 100 percent, this representing approximately 0.5 mole of HNO₃. The reaction is initiated at 0° C., with the stirred mixture then being allowed to stand for one hour at room temperature, following which the mixture is slowly heated to 85° C. over a further reaction period of one hour. The resulting reaction mixture is cooled and then poured over ice water, thereby forming a yellow precipitate which is filtered off, washed with water and finally recrystallized from hexane and dried. This product, which is identified by infrared analysis as 2,3,5-trichloro-6-(methylsulfonyl)-4-nitropyridine, has a melting point of 136° C. and is substantially insoluble in water and of good solubility in acetone and benzene.

EXAMPLE 2

2,3,5-trichloro-6-(trifluoromethyl)-4-nitropyridine

A quantity of 9.6 g. (0.034 mole) of 2,3,5-trichloro-6-(trifluoromethyl)-4-pyridinethiol is added slowly over a ten minute period to 40 ml. of stirred nitric acid having an $HNO_3$ concentration of 100 percent (approximately 1 mole $HNO_3$), the temperature rising from 0° C. at the beginning of the addition to 20° C. at the completion thereof. The stirred solution is then allowed to stand for 30 minutes at 25° C., after which the temperature is gradually raised to a level of 80° C. over a 20 minute period. The reaction mixture is then cooled to 40° C. and poured into ice water thereby inducing the precipitation of a yellow solid which is filtered off, washed with water and dried. There is recovered 2.7 g. of a light yellow waxy product having a melting point of 32°–33° C. which is moderately soluble in water and highly soluble in acetone and benzene. It is identified by infrared analysis as 2,3,5 - trichloro-6-(trifluoromethyl)-4-nitropyridine, and this analysis is confirmed by elemental analysis which discloses the compound to have carbon, chlorine, fluorine and nitrogen contents of 24.12, 35.84, 19.49 and 9.28 percent, respectively, as against theoretical values for the subject compound of 24.39, 36.0, 19.29 and 9.48 percent, respectively.

EXAMPLE 3

3,5,6-trichloro-4-nitropicolinonitrile

In a manner similar to that described above in Example 2, 3,5,6-trichloro-4-mercaptopicolinonitrile (10 g., 0.0411 mole) is reacted with 40 ml. of nitric acid having an $HNO_3$ concentration of 100 percent (approximately 1 mole). On pouring the reaction mixture into ice water, there is precipitated a solid product which is recovered by filtration. This solid is slurried with hexane and the mixture is filtered, after which the undissolved portion is added to dichloromethane and this mixture is filtered. The two filtrates so obtained are combined and the solvent portion is removed as the liquid is heated on a steam bath. The orange colored oil (2.66 g.) which remains in the flask is then taken up in hexane and the resulting solution is cooled and allowed to stand. There crystallizes out 2.16 g. of an orange solid having a melting point of 67° C. This solid is identified by infrared analysis as 3,5,6-trichloro-4-nitropicolinonitrile. This analysis is confirmed by elemental analysis which discloses the compound to have carbon, chlorine, nitrogen and oxygen contents of 29.06, 41.88, 16.76 and 12.30 percent, respectively, as against theoretical values for these elements of 28.50, 42.20, 16.65 and 12.70 percent, respectively, for the subject compound.

EXAMPLE 4

3,5-dichloro-6-(methylsulfonyl)-4-nitropyridine

In a manner similar to that described in Example 2, 10 g. (0.03878 mole) of 3,5-dichloro-2-(methylsulfonyl)-4-pyridinethiol is reacted with 40 ml. of 100 percent $HNO_3$. On then pouring the reaction mixture into ice water, an orange-colored solid precipitates which is filtered off and taken up in benzene. The insoluble residue is filtered off and the benzene evaporated. The residue is taken up in pentane and the product compound is recrystallized from the resulting solution as a tan-colored solid having a melting point of 158° C. which is insoluble in water and of good solubility in acetone, benzene, pentane and hexane. This solid is identified by infrared analysis as 3,5-dichloro-6-(methylsulfonyl)-4-nitropyridine, said identification being confirmed by elemental analysis which discloses the compound to have carbon, chlorine, nitrogen and sulfur contents of 28.3, 27.62, 10.66 and 12.54 percent, respectively, as against theoretical values of 26.58, 26.16, 10.33 and 11.83 percent, respectively, for the subject compound.

EXAMPLE 5

2,3,5-tribromo-6-(methylsulfonyl)-4-nitropyridine

In a manner similar to that described in Example 4, but recrystallizing the product from hexane rather than pentane, 5.6 g. (0.0131 mole) of 2,3,5-tribromo-6-(methylsulfonyl)-4-pyridinethiol is reacted with 25 ml. of 100 percent $HNO_3$. The yellow solid product recovered has a melting point of 173° C. and is substantially insoluble water and of good solubility in acetone, benzene and hexane. It is identified by infrared analysis as 2,3,5 - tribromo-6-(methylsulfonyl)-4-nitropyridine. This analysis is confirmed by elemental analysis which discloses the compound to have carbon, bromine, nitrogen and sulfur contents of 17.2, 53.74, 6.2 and 7.37 percent, respectively, as against theoretical values of 16.42, 54.62, 6.38 and 7.31 percent, respectively, for the subject compound.

EXAMPLE 6

Using essentially the same procedures as described above in Example 2, other substituted polyhalonitropyridines are prepared by reacting nitric acid of 100 percent concentration with the indicated pyridinethiol derivative, as follows:

2,3,5-tribromo-4-nitro-6-(trifluoromethyl)pyridine having a molecular weight of 428.8 by the reaction 2,3,5-tribromo-6-(trifluoromethyl) - 4 - pyridinethiol with nitric acid;

2,3,5-tribromo-4-nitropicolinonitrile having a molecular weight of 385.82 by the reaction of 2,3,5-tribromo-4-mercaptopicolinonitrile with nitric acid;

3,5-dibromo-4-nitropicolinonitrile having a molecular weight of 306.91 by the reaction of 3,5-dibromo-4-mercaptopicolinonitrile with nitric acid;

2,5-dichloro-4-nitro-6-(trifluoromethyl)pyridine having a molecular weight of 260.98 by the reaction of 2,5-dichloro-6-(trifluoromethyl) - 4 - pyridinethiol with nitric acid;

3,6-dichloro-4-nitropicolinonitrile having a molecular weight of 218.0 by the reaction of 3,6-dichloro-4-mercaptipicolinonitrile with nitric acid;

3,5-dichloro-4-nitro-6-(trifluoromethyl)pyridine having a molecular weight of 260.98 by the reaction of 3,5-dichloro-6-(trifluoromethyl) - 4 - pyridinethiol with nitric acid;

3,5-dibromo-6-(methylsulfonyl)-4-nitropyridine having a molecular weight of 356.0 by the reaction of 3,5-dibromo-6-(methylsulfonyl) - 4 - pyridinethiol with nitric acid;

3,5-dichloro-4-nitropicolinonitrile having a molecular weight of 218.0 by the reaction of 3,5-dichloro-4-mercaptopicolinonitrile with nitric acid;

3,5-dibromo-4-nitropicolinonitrile having a molecular weight of 306.91 by the reaction of 3,5-dibromo-4-mercaptopicolinonitrile with nitric acid; and 3,5-dibromo-4-nitro-6-(trifluoromethyl)pyridine having a molecular weight of 349.9 by the reaction of 3,5-dibromo-6-(trifluoromethyl) - 4 - pyridinethiol with nitric acid.

The substituted polyhalo-4-nitropyridine compounds of the present invention are useful as pesticides and have particular utility as fungicides and bacteriocides and as selective herbicidal agents for the control of various undesirable weed plants. In such applications the pest to be controlled is contacted with a pesticidal amount of one or more of the compounds of the invention. For control of bacterial and fungal pests, the organism is contacted with a pesticidal amount which is also an antimicrobial amount of the compound. For control of weed pests, a pesticidal amount which is also an herbicidal amount is employed.

For all such uses the present substituted compounds can be employed in an unmodified form or they can be dispersed on a finely divided solid and employed as dust or dispersed in water with or without the aid of a surface active agent and the resulting aqueous suspensions employed as drenches or sprays. In other procedures, the products are employed as active constituents in solvent solutions, in oil-in-water or water-in-oil emulsions, or in aqueous dispersions. All such ingredients and adjuvants cooperate with the active component so as to facilitate the invention and obtain an improved and outstanding result.

The foregoing augmented compositions are adapted to be formulated as liquid or solid concentrates and subsequently diluted with additional liquid or solid adjuvants to produce the ultimate treating composition. Suitable emulsifiable liquid concentrates are formulations of the active substituted pyridine compound in a suitable organic solvent therefor such as alcohols, alkyl ethers of glycols and polyglycols, ketones, aromatics and petroleum distillates, together with an ionic or non-ionic emulsifying agent or a mixture thereof. Such emulsions are preferably designated such that they are self-dispersing with good stability characteristics. The dusts and dust concentrates can be prepared by dispersing the active toxicant compounds in and on a finely divided inert solid support such as diatomaceous earth, bentonite, fuller's earth, attapulgite and similar clays. For the preparation of wettable powders, the solid carrier may be mechanically ground in admixture with the active component hereof and a surface active dispersing agent.

Any of the foregoing compositions can be distributed so as to contact pests with a pesticidal amount of one or more of the active compounds. This amount depends largely upon the manner of distribution, the type of pest being treated and its extent or severity of development and the degree of control desired or required for any particular purpose. Generally, the effective or pesticidal dosage ranges from 1 to 10,000 or more parts of toxicant per million parts of applied composition. For the control of higher plants in soil, the active substituted pyridine compounds hereof ordinarily are distributed in soil in amounts of from about 0.1 to 50 lbs. or more per acre so as to contact seeds and emerging seedlings of the vegetation to be controlled. For the control of bacteria and of lower plants such as fungal organisms, the active compounds usually are applied to growth media of said organisms in amounts to provide for about 10 or less to about 5,000 or more parts by weight of the active substituted pyridine compound per million parts of the ultimate treating compostiion.

In representative operations, 3,5,6-trichloro-4-nitropicolinonitrile is dispersed in warm melted nutrient agar which is then poured into petri dishes and allowed to solidify, the pyridazine compound being employed in a number of different amounts to provide from 1 to 400 parts by weight thereof per million parts (p.p.m.) of the ultimate agar composition. The surface of the agar is then inoculated with a variety of bacterial and fungal pest organisms, and the inoculated plates are incubated under conditions conductive to bacterial and fungal growth. Similar check plates in which the agar contains no active pyridazine or other toxicant compound are similarly inoculated and incubated. In such operations, 100 percent control is obtained of the organisms *Staphylococcus aureus, Trichophton mentagrophytes* and *Bacillus subtilis* at a level of 10 p.p.m; of *Candida albicans, Aspergillus terreus, Candida pelliculosa* and *Pullularia pullulans* at a level of 100 p.p.m.; and of *Pseudomonas aeruginosa, Escherichia coli, Aerobacter aerogenes* and *Salmonella typhosa* at a level of 500 p.p.m.

In similar tests wherein the chemical 2,3,5-trichloro-4-nitro-6-(trifluoromethyl)pyridine is admixed in agar solutions, complete control is obtained of the organisms *Trichophton mentagrophytes, Pullularia pullulans, Candida albicans, Aspergillus terreus* and *Candida pelliculosa* at a level of 10 p.p.m. of the active chemical, and of the organisms *Staphylococcus aureus, Bacillus subtilis* and Baterium, acid fast at a level of 100 p.p.m.

With other agar tests incorporating 2,3,5-trichloro-6-(methylsulfonyl)-4-nitropyridine as the active chemical, complete control is obtained of the organisms *Staphylococcus aureus, Bacillus subtilis, Aspergillus terreus, Candida pelliculosa* and *Pullularia pullulans* at a level of 500 p.p.m. of active chemical, while similar control is obtained of the organism *Candida albicans* at a level of 100 parts per million.

In representative operations the chemical 2,3,5-trichloro-4-nitro-6-(trifluoromethyl)pyridine in an aqueous emulsified composition containing about 100 parts by weight of the active compound per million parts of the aqueous composition, when applied as a soil drench at a dosage rate of 10 lbs. of active chemical per acre, provides 100 percent control of fertile soil planted with pig weed. Similarly, this chemical gives 95 percent control of *Chlorella algae* at a concentration of 10 parts per million parts of the algae supporting medium and 100 percent control of the weed pest spiny clotbur when applied thereto in the form of an aqueous spray emulsion containing 4,000 parts per million of active chemical.

In other operations, either of the chemicals 3,5,6-trichloro-4-nitropicolinonitrile or 3,5,6-trichloro-4-nitro-6-(trifluoromethyl)pyridine, when applied as a soil drench in the manner described above at a concentration of 100 parts of active chemical per million parts of soil infested with *Rhizoctonia solani*, a damp-off pathogen, effective control of this organism is realized when the soil is subsequently planted to cotton.

When applied at a dosage level of from about 100 to 5,000 parts per million, each of the compounds of the present invention, the utility of which is not specifically recited above, has the ability to kill, inhibit or otherwise control one or more of the aforesaid or other fungal, bacterial, parasital, weed or aquatic pests.

The cyano- or trifluoromethyl- substituted polyhalo-4-pyridinethiol reactants employed as starting materials in synthesizing the correspoending 4-nitropyridine derivatives of this invention can be prepared by reacting the corresponding substituted polyhalopyridine derivatives containing a bromo or a chloro atom in the 4-position of the pyridine ring with sodium sulfide or sodium hydrosulfide. In the case of the methylsulfonyl-substituted product, one or the other of the latter reagents is reacted with a polyhalopyridine containing a methylsulfonyl group in both the 2- and the 4-positions of the pyridine ring, the group in the 4-position being converted to a thiol group during the reaction. The reaction with a 4-chloro or 4-bromo group is conducted under reflux conditions, while that with a methylsulfonyl group takes place readily at ambient temperatures.

In a typical reflux preparation, $Na_2S \cdot 9H_2O$ and tetrachloro-2-(trifluoromethyl)pyridine in an isopropanol medium are refluxed for 3 hours. The reaction mixture is then cooled, diluted with water and acidified, thereby precipitating the 2,3,5-trichloro-6-(trifluorometthyl)-4-pyridinethiol which is filtered off, recrystallized from hexane and carefully dried with $Na_2SO_4$ before being reacted with concentrated $HNO_3$ to form the ultimate 4-nitro-product. In turn, taking the reaction back a step further, the substituted tri- or tetrahalopyridine compounds reacted with the sodium sulfide compound can be prepared by known methods involving halogenation of the appropriate pyridine derivatives. Thus, 3,4,5- and 3,4,6-trichloro- as well as 3,4,5,6-tetrachloro-2-(trifluoromethyl)pyridine can be prepared by reacting 2-methylpyridine first with hydrogen chloride to produce 2-methylpyridine hydrochloride, then with chlorine gas at 95°–110° C. (while inactivating the mixture) to form 2-(trichloromethyl)pyridine derivatives of varying degrees of chlorination, and finally with antimony trifluorodichloride to convert the CCl₃ group to CF₃. The several tri- and tetrachloride compounds formed (as well as any mono- or dichloro derivatives) can be separated from one another prior to the last mentioned step by methods of portional distillation or otherwise. In another method, 2-(trichloromethyl)pyridine or picolinonitrile can be converted to various partially and fully chlorinated derivatives by subjecting a vaporous mixture of the starting compound, chlorine and an inert diluent gas to temperature of about 400°–490° C. for a brief contact time. The corresponding tri- and tetrabromo derivatives of picolinonitrile or 2-(trichloromethyl)pyridine can be prepared by known methods such, for example, as by reacting the corresponding polychloro product with hydrogen bromide in an appropriate solvent, or by subjecting a vaporous mixture of the 2-substituted pyridine, bromine and an inert diluent gas to temperatures of about 450°–600° C. for a brief contact time and then recovering the desired product from the reaction mixture.

The polyhalo-2,4 - di(methylsulfonyl)pyridine compounds to be reacted with a sodium sulfide can be prepared by first reacting the appropriate tetra- or pentachloro-(or bromo-)pyridine compound (1 mol) with 2 moles of sodium methyl mercaptide (NaSCH₃), the reaction being conducted in methanol under reflux. The resulting ditrihalo-2,4-di(metthylthiol)pyridine is then oxidized with hydrogen peroxide or otherwise to convert the CH₃S— group to CH₃SO₂— groups. The resulting compound, in a solvent such as dimethoxyethane, is then reacted at room temperatures with an aqueous solution of Na₂S·9H₂O, the reaction proceeding rapidly. Finally, the solution is acidified with dilute HCl to convert the sodium salt to the desired polyhalo-2-(methylsulfonyl)-4-pyridinethiol compound which is filtered off and carefully dried with Na₂SO₄ before being reacted with concentrated HNO₃ to form the desired compound of the present invention.

I claim:
1. A substituted polyhalo-4-nitropyridine compound of the formula

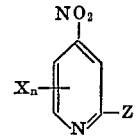

wherein X represents the chloro or bromo, $n$ is an integer having a value of 2 or 3 and Z is cyano.

2. The compound as defined in claim 1 which is 3,5,6-trichloro-4-nitropicolinonitrile.

References Cited
UNITED STATES PATENTS 3,651,066   3/1972   Domenico _____ 260—290 HL ALAN L. ROTMAN, Primary Examiner U.S. Cl. X.R.

260—290 HL, 294.8 F; 71—94; 424—263